United States Patent
Hammons

(10) Patent No.: US 9,394,683 B1
(45) Date of Patent: Jul. 19, 2016

(54) BIRD DETERRENT DEVICE

(71) Applicant: Dennis Hammons, Springfield, IL (US)

(72) Inventor: Dennis Hammons, Springfield, IL (US)

(*) Notice: Subject to any disclaimer, the term of this patent is extended or adjusted under 35 U.S.C. 154(b) by 0 days.

(21) Appl. No.: 14/733,891

(22) Filed: Jun. 8, 2015

(51) Int. Cl.
*E04B 1/72* (2006.01)
*A01M 29/32* (2011.01)
*E04D 13/08* (2006.01)
*E04D 13/00* (2006.01)

(52) U.S. Cl.
CPC .................. *E04B 1/72* (2013.01); *A01M 29/32* (2013.01); *E04D 13/004* (2013.01); *E04D 13/08* (2013.01)

(58) Field of Classification Search
CPC .................. E04D 2013/0886; E04D 13/0645; E04D 13/004; E04B 1/72; A01M 29/30; A01M 29/32
See application file for complete search history.

(56) References Cited

U.S. PATENT DOCUMENTS

| D279,797 S | * | 7/1985 | Brunetto | D10/64 |
| 5,003,724 A | * | 4/1991 | Vestuti | E01F 15/0469 47/31.1 |
| 5,092,088 A | | 3/1992 | Way | |
| 5,511,316 A | * | 4/1996 | Fischer | B43L 13/201 33/1 F |
| 6,134,843 A | | 10/2000 | Tregear | |
| 7,581,359 B2 | | 9/2009 | Bukeavich | |
| D666,480 S | * | 9/2012 | Peacock | D8/380 |
| 8,640,397 B2 | * | 2/2014 | Donoho | A01M 29/32 52/101 |
| 2004/0194423 A1 | * | 10/2004 | Payne | A01M 29/32 52/741.1 |
| 2009/0145054 A1 | * | 6/2009 | Wents | H02G 3/0608 52/100 |
| 2011/0005156 A1 | * | 1/2011 | Laufer | E04D 13/004 52/244 |

FOREIGN PATENT DOCUMENTS

| GB | EP 2141295 A2 * | 1/2010 | E04D 13/064 |
| GB | 2522069 A * | 7/2015 | A01M 29/32 |

* cited by examiner

*Primary Examiner* — Elizabeth A Quast
(74) *Attorney, Agent, or Firm* — RG Patent Consulting, LLC; Rachel Gilboy

(57) ABSTRACT

An attractive and functional device that is easily mounted to the downspout of a home or building to adjust to fit most any size or angle downspout, this product would obstruct birds and other pests from nesting and building in and around downspouts to eliminate the mess and potential damage these nests can cause, preserving the exterior of the home, and eliminating the need for additional maintenance and costly repairs due to debris, blockage and water damage.

12 Claims, 3 Drawing Sheets

BIRD DETERRENT DEVICE

CROSS-REFERENCE TO RELATED APPLICATION

The present application is related to and claims priority from prior provisional application Ser. No. 62/006,932, filed Jun. 3, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of bird deterrent devices and more specifically relates to an attractive and functional device that is easily mounted to the downspout of a home or building to adjust to fit most any size or angle downspout, this product would obstruct birds and other pests from nesting and building in and around downspouts to eliminate the mess and potential damage these nests can cause, preserving the exterior of the home, and eliminating the need for additional maintenance and costly repairs due to debris, blockage and water damage.

2. Description of the Related Art

A downspout, waterspout is a pipe for carrying rainwater from a rain gutter. Downspouts are usually vertical and usually extend down to ground level. The water is directed away from the building's foundation, to protect the foundations from water damage. The water is usually piped to a sewer, or let into the ground through seepage. Unfortunately, birds migrate to downspouts as a place to nest thereby leading to bird dropping and long-term damage to a downspout.

Various attempts have been made to solve problems found in bird deterrent devices art. Among these are found in: U.S. Pat. No. 7,581,359 to Lisa Bukeavich; U.S. Pat. No. 5,092,088 to Michael Way; and U.S. Pat. No. 6,134,843 to Marc Tregear. This prior art is representative of bird deterrent devices.

None of the above inventions and patents, taken either singly or in combination, is seen to describe the invention as claimed. Thus, a need exists for a reliable bird deterrent device, an attractive and functional device that is easily mounted to the downspout of a home or building to adjust to fit most any size or angle downspout, this product would obstruct birds and other pests from nesting and building in and around downspouts to eliminate the mess and potential damage these nests can cause, preserving the exterior of the home, and eliminating the need for additional maintenance and costly repairs due to debris, blockage and water damage and to avoid the above-mentioned problems.

BRIEF SUMMARY OF THE INVENTION

In view of the foregoing disadvantages inherent in the known bird deterrent devices art, the present invention provides a novel bird deterrent device. The general purpose of the present invention, which will be described subsequently in greater detail, is to provide an attractive and functional device that is easily mounted to the downspout of a home or building to adjust to fit most any size or angle downspout, this product would obstruct birds and other pests from nesting and building in and around downspouts to eliminate the mess and potential damage these nests can cause, preserving the exterior of the home, and eliminating the need for additional maintenance and costly repairs due to debris, blockage and water damage. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, No Nest, constructed and operative according to the teachings of the present invention.

The various embodiments of the present invention will hereinafter be described in conjunction with the appended drawings.

DETAILED DESCRIPTION

As discussed above, embodiments of the present invention relate to a bird deterrent device and more particularly a bird deterrent device, an attractive and functional device that is easily mounted to the downspout of a home or building to adjust to fit most any size or angle downspout, this product would obstruct birds and other pests from nesting and building in and around downspouts to eliminate the mess and potential damage these nests can cause, preserving the exterior of the home, and eliminating the need for additional maintenance and costly repairs due to debris, blockage and water damage.

Figure 1:
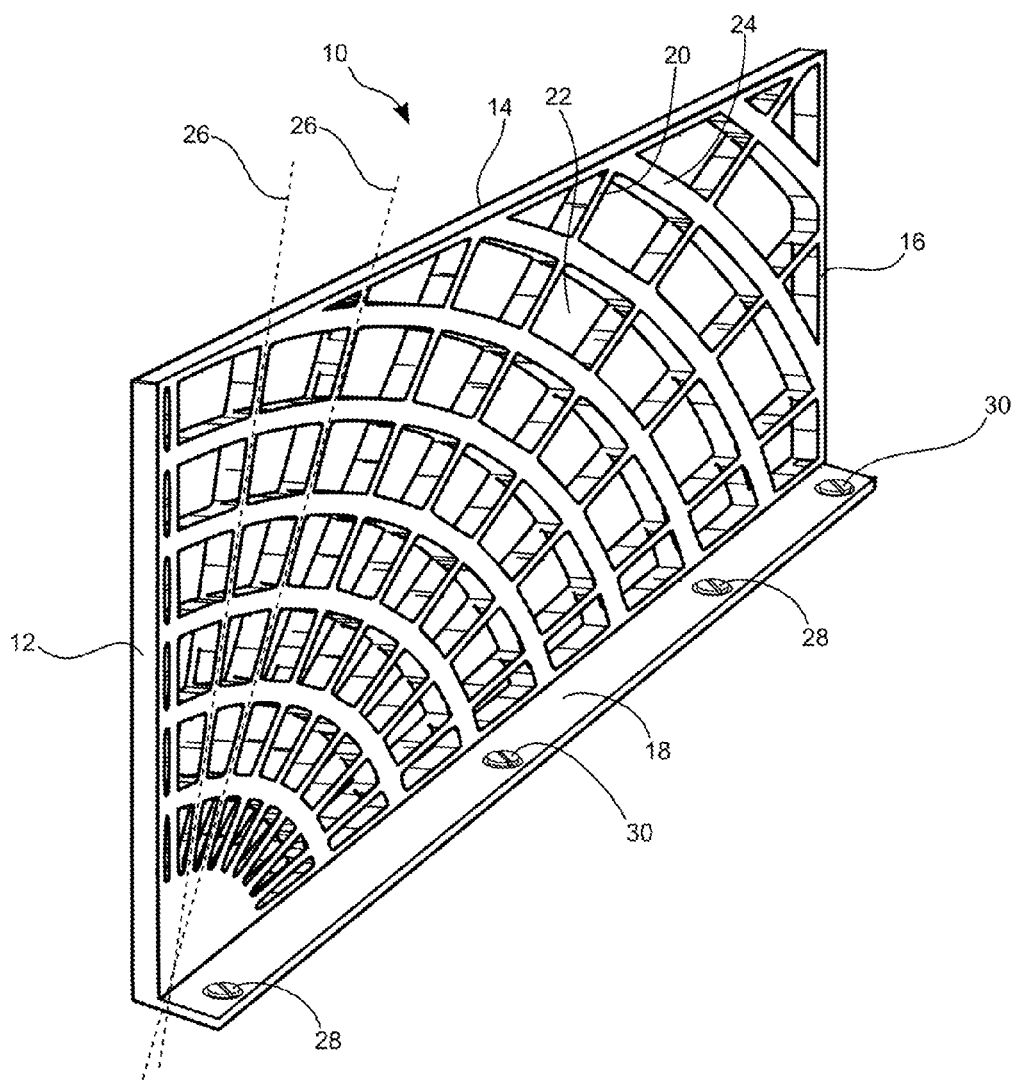
FIG. 1 shows a perspective view illustrating the preferred embodiment of the present invention.

Referring now to the drawings FIG. 1, the bird deterrent device (10) comprising a novel product offering consumers a practical solution to the aforementioned challenges. The bird deterrent device comprises tapering sides (12, 14, 16, and 18) forming a trapezoidal shape surrounding a rigid planar mesh platform (20) having a plurality of holes (22) therethrough forming a shape of a netting adapted to allow the passage of wind and high wind gusts, as well as for aesthetic appeal. Thus breathable, this design would help ensure that the bird deterrent device (10) stays in place, even through unfavorable weather conditions. The netting shape of the rigid planar mesh platform (20) is formed by a series of successive radial arcs (24) and arms (26) which also define the shapes of the plurality of holes (22).

Figure 2:
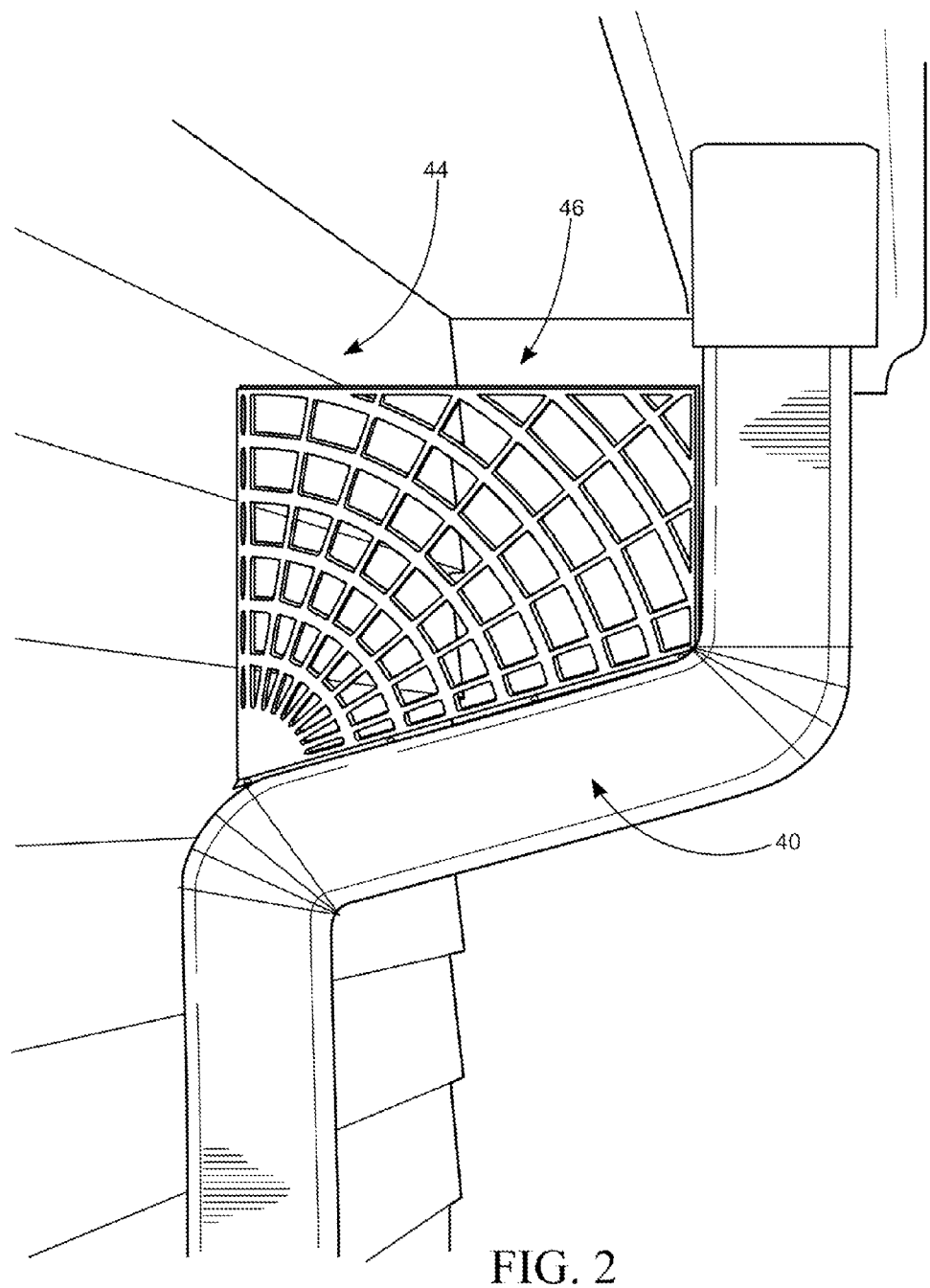
FIG. 2 shows a side view illustrating the preferred embodiment of the present invention attached to the downspout of an existing drainage system of a building.

One of the novel features of the instant bird deterrent device (10) is that each radial arm (26) can but cut along its length and a section of the platform (20) removed to thereby fit within differently sized spaces that a user may want to mount the device. For instance, FIG. 2 shows a drainage downspout (40) of a building (44) installed such that a space

Figure 3:
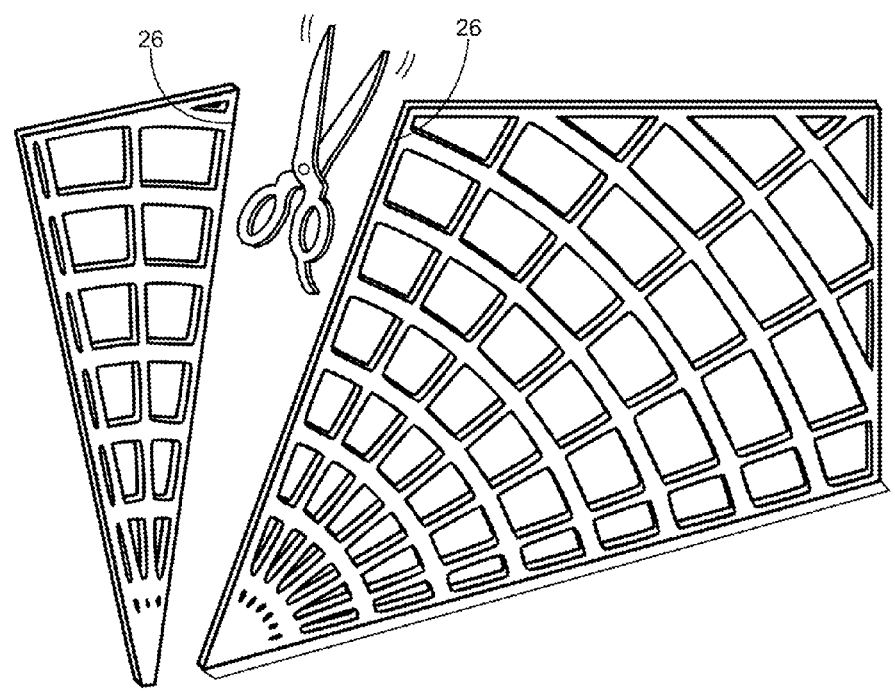
FIG. 3 shows the process of cutting the bird deterrent device to remove a piece thereof to thereby fit within a differently shaped space between a drainage downspout and the structure of a building.

(46) is formed and wherein birds tend to rest and nest. The instant bird deterrent device (10) is shaped to closely fit within this space (46) and then be securely mounted to the drainage downspout (40) via mounting screws (30) applied through mounting holes (28) and into a wall of the drainage downspout (40). Other types of mounting fasteners can be used that are well known in the art. However, many instances exist wherein a drainage downspout is shaped differently or the position of the drainage downspout with respect to the building it is attached to is different and the resulting space therebetween is shaped differently. In these instances the instant bird deterrent device (10) can be re-shaped to fit the space by cutting one of the radial arms (26) along its length, as shown in FIG. 3 and removing a piece of the platform (20) before mounting.

The bird deterrent device (10) would measure approximately fifteen inches (15") in length, eight inches (8") in width, and two inches (2") in thickness, and can be constructed out of durable plastic or another light-weight, sturdy material, and can be offered in a variety of colors to suit any homeowner's preference.

With the bird deterrent device (10) in place, birds and other pests would be unable to nest atop the downspout of a home or building. As such, homeowners could be spared the expense of siding, roofing, landscaping, and other repairs that might be required as a result from damages caused by blockage and debris. Sparing the consumer the hassles and expense of additional maintenance and extensive repair work, as well as keeping the outside of the home looking tidy, the bird deterrent device should be eagerly received by concerned homeowners everywhere, a sizable market potential. The bird deterrent device is cost-effective to produce.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A bird deterrent member used to fill a space between a drainage downspout and structural members of a building, said bird deterrent member comprising:
   a plurality of sides forming a trapezoidal shape;
   a planar platform formed within and between said plurality of sides and including:
      a planar surface formed between said plurality of sides;
         wherein one of said plurality of sides forming said trapezoidal shape has a width extending perpendicularly from said planar surface forming a mounting surface adapted to be securely attached to said drainage downspout;
      a plurality of holes therethrough adapted to allow the passage of wind and wind gusts; and
      a series of successive radial arcs and arms that define the shapes of said plurality of holes,
         wherein said radial arcs and arms are formed from a material that is adapted to be cut, such that a chosen portion of said planar platform can be removed to thereby change the dimensions of said trapezoidal shape to thereby be adapted to fit differently sized spaces between a drainage downspout and said structural members of a building; and
   at least one attachment member adapted to be removably connected between said mounting surface of said one of said plurality of sides and said drainage downspout of said building;
   wherein said radial arcs and arms successively radiate from a point defined by one corner of said planar platform adjacent said side forming said mounting surface.

2. The bird deterrent member of claim 1, wherein said radial arcs and arms are formed from plastic material.

3. The bird deterrent member of claim 1, wherein said planar platform is formed from a plastic material.

4. The bird deterrent member of claim 1, wherein said attachment member is formed as at least one mounting screw; and wherein said mounting surface includes at least one mounting hole, such that each of said at least one mounting screw are adapted to be threaded through a respective said at least one mounting hole and into a wall of said drainage downspout, to thereby removably secure said bird deterrent member to said drainage downspout.

5. The bird deterrent member of claim 1, wherein said planar platform is formed having dimensions of fifteen inches in length, eight inches in width, and two inches in thickness.

6. The bird deterrent member of claim 1, wherein the angular distance between each said radial arm is equal, and the radial distance between each said radial arc is equal.

7. A combination of a drainage downspout and a bird deterrent member used to fill a space between said drainage downspout and structural members of a building, said combination comprising:
   a drainage downspout adapted to be connected to a side of a building,
      wherein said drainage downspout has a length including at least one curved section, such that when connected to said side of a building a space is created therebetween; and
   a bird deterrent member used to fill a space between a drainage downspout and structural members of a building, said bird deterrent member comprising:
      a plurality of sides forming a trapezoidal shape;
      a planar platform formed within and between said plurality of sides and including:
         a planar surface formed between said plurality of sides;
            wherein one of said plurality of sides forming said trapezoidal shape has a width extending perpendicularly from said planar surface forming a mounting surface adapted to be securely attached to said drainage downspout;
         a plurality of holes therethrough adapted to allow the passage of wind and wind gusts; and
         a series of successive radial arcs and arms that define the shapes of said plurality of holes,
            wherein said radial arcs and arms are formed from a material that is adapted to be cut, such that a chosen portion of said planar platform can be removed to thereby change the dimensions of said trapezoidal shape to thereby be adapted to fit differently sized spaces between a drainage downspout and said structural members of a building; and
      at least one attachment member adapted to be removably connected between said mounting surface of said one of said plurality of sides and said drainage downspout of said building;

wherein said radial arcs and arms successively radiate from a point defined by one corner of said planar platform adjacent said side forming said mounting surface.

8. The combination of claim 7, wherein said radial arcs and arms are formed from plastic material.

9. The combination of claim 7, wherein said planar platform is formed from a plastic material.

10. The combination of claim 7, wherein said attachment member is formed as at least one mounting screw; and wherein said mounting surface includes at least one mounting hole, such that each of said at least one mounting screw are adapted to be threaded through a respective said at least one mounting hole and into a wall of said drainage downspout, to thereby removably secure said bird deterrent device member to said drainage downspout.

11. The combination of claim 7, wherein said planar platform is formed having dimensions of fifteen inches in length, eight inches in width, and two inches in thickness.

12. The combination of claim 7, wherein the angular distance between each said radial arm is equal, and the radial distance between each said radial arc is equal.

\* \* \* \* \*